United States Patent
Kasahara

(10) Patent No.: US 9,304,715 B2
(45) Date of Patent: Apr. 5, 2016

(54) APPARATUS AND METHOD FOR STORING AND REUSING SETTINGS

(75) Inventor: Kimito Kasahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 499 days.

(21) Appl. No.: 13/038,209

(22) Filed: Mar. 1, 2011

(65) Prior Publication Data

US 2011/0216339 A1 Sep. 8, 2011

(30) Foreign Application Priority Data

Mar. 2, 2010 (JP) .................................. 2010-045542

(51) Int. Cl.
*G06F 3/12* (2006.01)
*G06K 15/00* (2006.01)

(52) U.S. Cl.
CPC ........................................ *G06F 3/12* (2013.01)

(58) Field of Classification Search
CPC ... G06F 3/1204; G06F 3/1205; G06F 3/1253; G06F 3/1257; G06F 3/1275; G06F 3/1285; H04N 1/00949
USPC ....................................................... 358/1.13
See application file for complete search history.

(56) References Cited

U.S. PATENT DOCUMENTS

| | | | |
|---|---|---|---|
| 7,120,424 B1 * | 10/2006 | Coan et al. | 455/414.1 |
| 2004/0145779 A1 * | 7/2004 | Kuribayashi | 358/1.16 |
| 2005/0200879 A1 * | 9/2005 | Nakagiri et al. | 358/1.13 |
| 2006/0015476 A1 * | 1/2006 | Ueno | 707/1 |
| 2006/0087680 A1 * | 4/2006 | Maeda | 358/1.15 |
| 2006/0173964 A1 * | 8/2006 | Oohama et al. | 709/206 |
| 2006/0250631 A1 * | 11/2006 | Igarashi | 358/1.13 |
| 2007/0041031 A1 * | 2/2007 | Kaneko | 358/1.14 |
| 2007/0091346 A1 * | 4/2007 | Ogura et al. | 358/1.14 |
| 2008/0007760 A1 * | 1/2008 | Kimura | 358/1.14 |
| 2008/0144087 A1 * | 6/2008 | Mitsui | 358/1.15 |
| 2008/0204805 A1 * | 8/2008 | Ming | 358/1.16 |
| 2008/0294983 A1 * | 11/2008 | Hoshino et al. | 715/273 |
| 2008/0309974 A1 * | 12/2008 | Shimazaki et al. | 358/1.15 |
| 2009/0225366 A1 * | 9/2009 | Emori | 358/1.15 |
| 2009/0310171 A1 * | 12/2009 | Onoda | 358/1.15 |
| 2009/0316184 A1 * | 12/2009 | Ohyama et al. | 358/1.15 |

FOREIGN PATENT DOCUMENTS

| | | |
|---|---|---|
| JP | 2003-330638 A | 11/2003 |
| JP | 2004-287860 A | 10/2004 |
| JP | 2006135570 A * | 5/2006 |

OTHER PUBLICATIONS

JP2006-135570 A machine translation.pdf, Kuwabara, Tetsuya, May 2006, pp. 1-9.*

* cited by examiner

*Primary Examiner* — Dov Popovici
(74) *Attorney, Agent, or Firm* — Canon USA, Inc., IP Division

(57) ABSTRACT

An apparatus includes a storage unit configured to store a setting history indicating a setting content relating to an executed processing, an acquisition unit configured to acquire a definition file, and a processing unit configured to execute the processing according to the acquired definition file. Whether the processing which has been executed in the image processing apparatus is processing based on the definition file is determined. In a case where the executed processing is the processing based on the definition file, the setting history indicating the setting content relating to the processing is not stored.

17 Claims, 16 Drawing Sheets

FIG.5

410 PROCESS DEFINITION FILE

```
<?xml version="1.0" encoding="UTF-8" ?>
```
501 — `<Process id="0001" caption="SCAN AND TRANSMIT MAIL TO SECTION CHIEF">`
502 — `<Scan>`
503 — `    <Setting type="color">`
`        GRAY_SCALE`
`    </Setting>`
`    <Setting>··· </Setting>`
`</Scan>`
504 — `<Send type="email">`
505 — `    <Setting type="address">`
`        manager@xxxx.xxxx`
`    </Setting>`
`    <Setting>··· </Setting>`
`</Send>`
`</Process>`

APPARATUS AND METHOD FOR STORING AND REUSING SETTINGS

BACKGROUND OF THE INVENTION

1. Field of the Invention

The present invention relates to an image processing apparatus that can execute processing using a process definition file and deal with a call function, a method for controlling the image processing apparatus, and a recording medium.

2. Description of the Related Art

There is generally used an image processing apparatus that has a reading function of reading an image from a document to generate image data, and a transmission function of transmitting the generated image data. A user of the image processing apparatus first designates reading parameters (reading size, resolution, density/image quality, magnification, and the like) for reading the image from the document. The user further designates a transmission protocol (E-mail, server message block (SMB), file transfer protocol (FTP), or facsimile), and a destination (E-mail address or telephone number) for transmitting the generated image data. After these items have been set, the image processing apparatus reads the image from the document to generate image data according to contents of the set items, and transmits the generated image data.

When a series of operations (reading and transmission) is performed by combining a plurality of functions such as the reading function and the transmission function, there are many contents that the user needs to designate, and hence there is a problem of a complex operation. Particularly, when wishing to perform processing based on the same setting content, the user must designate setting of the same content again, which is a burdensome operation.

Concerning this problem, Japanese Patent Application Laid-Open No. 2004-287860 discusses a system that creates, when executing a plurality of services in association, a process definition file defining a plurality of processing contents to be executed beforehand, and stores the process definition file in a server connected to an image processing apparatus via a network. The image processing apparatus acquires the process definition file from the server, and processes a document according to a description of the process definition file. According to a method discussed in Japanese Patent Application Laid-Open No. 2004-287860, a user can process contents described in the process definition file only by instructing execution of the process definition file prepared beforehand. Thus, user's operation time and labor can be reduced.

Japanese Patent Application Laid-Open No. 2003-330638 discusses an apparatus which, to reduce setting time and labor relating to a print function for printing, has a function (hereinafter, referred to as a call function) of saving contents processed in the past as a setting history permitted to be called again, and performing processing again by calling the setting history. According to a method discussed in Japanese Patent Application Laid-Open No. 2003-330638, when wishing to execute processing again with setting based on the same content as that of previous processing, a user only needs to select the setting history. Thus, user's operation time and labor can be reduced.

In the system that causes the image processing apparatus to execute processing by using the process definition file, for the sake of security, only a specific user is permitted to utilize the process definition file. In this case, the user permitted to utilize the process definition file is set beforehand, and the process definition file and a user ID are associated together in the server. The server requires user authentication before the process definition file is utilized.

On the other hand, when utilizing the image processing apparatus itself, if user authentication is unnecessary, generally, the setting history in the call function is not managed for each user. In such an image processing apparatus, after a certain user performs processing by using the process definition file, another user can perform processing according to the process definition file by using the call function.

SUMMARY OF THE INVENTION

According to an aspect of the present invention, an apparatus includes a storage unit configured to store a setting history indicating a setting content relating to an executed processing, a setting unit configured to set the indicated setting content if a user selects the stored setting history, an acquisition unit configured to acquire a process definition file describing a setting content for a processing to be executed, a processing unit configured to execute the processing according to the acquired definition file, and a determination unit configured to determine whether the executed processing is a processing based on the definition file. The storage unit does not store the setting history in a case where the executed processing is the processing based on the definition file.

According to another aspect of the present invention, an apparatus includes a storage unit configured to store a setting history indicating a setting content relating to processing which has been executed, a setting unit configured to set the indicated setting content if a user selects the stored setting history, an acquisition unit configured to acquire a definition file describing a setting content for processing to be executed, and a setting unit configured to set inhibition of processing not utilizing the definition file for the apparatus. The storage unit does not store the setting history indicating the setting content relating to the executed processing in a case where the setting unit sets inhibition of the processing not utilizing the definition file.

According to yet another aspect of the present invention, an apparatus includes a storage unit configured to store a setting history indicating a setting content relating to processing which has been executed, a setting unit configured to set the indicated setting content if a user selects the stored setting history, an input unit configured to input specifying information which specifies the user, an acquisition unit configured to acquire a definition file describing a setting content for processing to be executed and corresponding to the specifying information, a processing unit configured to execute the processing according to the acquired definition file, and a determination unit configured to determine whether the executed processing is a processing based on the definition file. The storage unit stores the setting history indicating the setting content relating to the processing together with the input specifying information in a case where the executed processing is the processing based on the process definition file.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates a specific description example of a process definition file according to the exemplary embodiment of the present invention.

DESCRIPTION OF THE EMBODIMENTS

Various exemplary embodiments, features, and aspects of the invention will be described in detail below with reference to the drawings.

Figure 1:
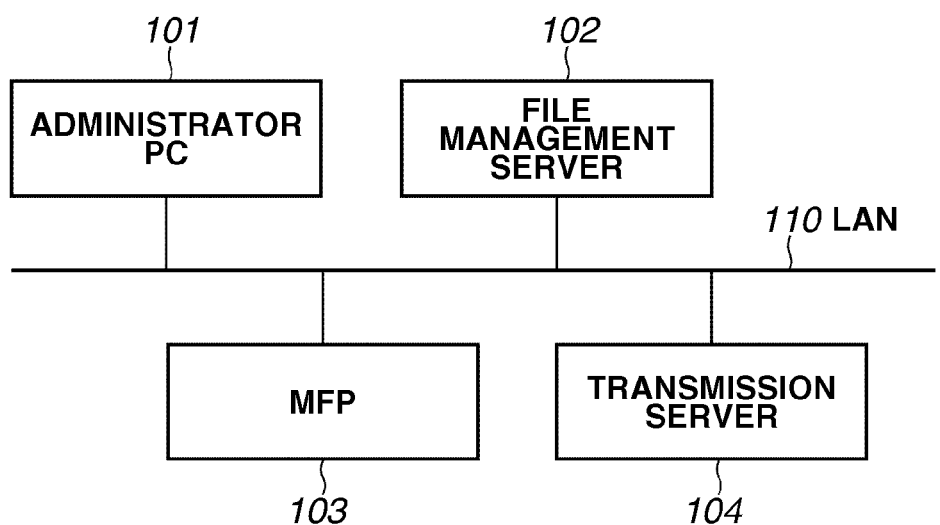
FIG. 1 illustrates an entire image processing system according to an exemplary embodiment of the present invention.

A first exemplary embodiment of the present invention is described. FIG. 1 illustrates an entire image processing system according to the first exemplary embodiment. An administrator PC 101, a file management server 102, an MFP 103, and a transmission server 104 are connected to a local area network (LAN) 110 to be able to communicate with one another. Each of the administrator PC, the file management server, and the transmission server includes an information processing apparatus such as a personal computer or a work station. The MFP is an example of an image processing apparatus, and can be another apparatus such as a single scanner, a facsimile or a printer.

The LAN 110 further includes, though not illustrated, an electronic mail server or a FTP server. The transmission server 104 and the administrator PC 101 can transfer electronic mail with each other, or transmit/receive image data based on FTP protocol. The LAN 110 can be a network other than the local area network, such as Internet or a wide area network (WAN), and can be a wireless network not limited to a wired network.

Figure 2:
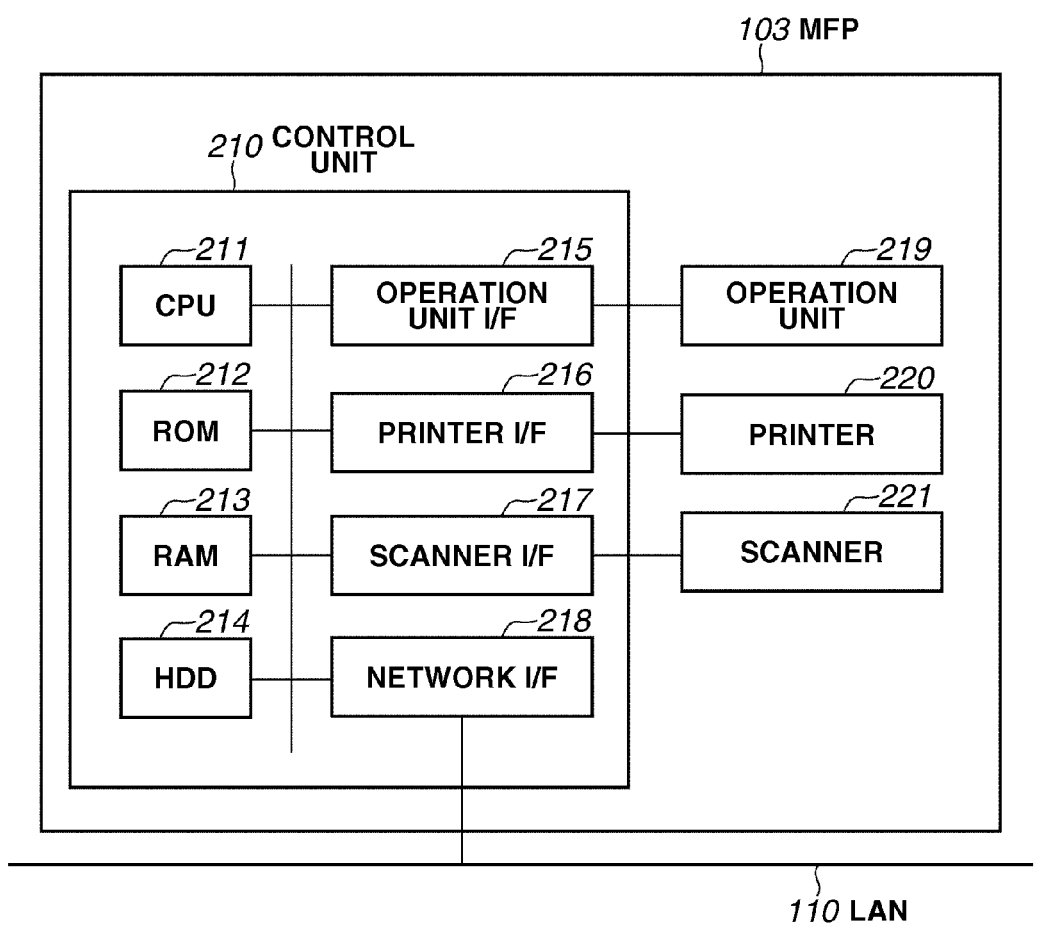
FIG. 2 is a block diagram illustrating a configuration of a multifunction peripheral (MFP) according to the exemplary embodiment of the present invention.

FIG. 2 is a block diagram illustrating a configuration of the MFP 103.

A control unit 210 that includes a central processing unit (CPU) 211 controls an overall operation of the MFP 103. The CPU 211 reads a control program stored in a read-only memory (ROM) 212 to perform various control processes such as reading control and transmission control. A random access memory (RAM) 213 is used as a main memory for the CPU 211 or a temporary storage area for a work area. A hard disk drive (HDD) 214 stores image data, various programs, or history information described below.

An operation unit interface (I/F) 215 interconnects an operation unit 219 and the control unit 210. The operation unit 219 includes a liquid crystal display unit having a touch panel function or a keyboard.

A printer I/F 216 interconnects a printer 220 and the control unit 210. Image data to be printed by the printer 220 is transferred from the control unit 210 to the printer 220 via the printer I/F 216, and printed on a recording medium by the printer 220.

A scanner I/F 217 interconnects a scanner 221 and the control unit 210. The scanner 221 reads an image from a document to generate image data (scan data), and inputs the image data to the control unit 210 via the scanner I/F 217.

A network I/F 218 connects the control unit 210 (the MFP 103) to the LAN 110. The network I/F 218 transmits the image data to an external apparatus (e.g., the transmission server 104) on the LAN 110 or receives various pieces of information from an external apparatus (e.g., the file management server 102) on the LAN 110.

Figure 3:
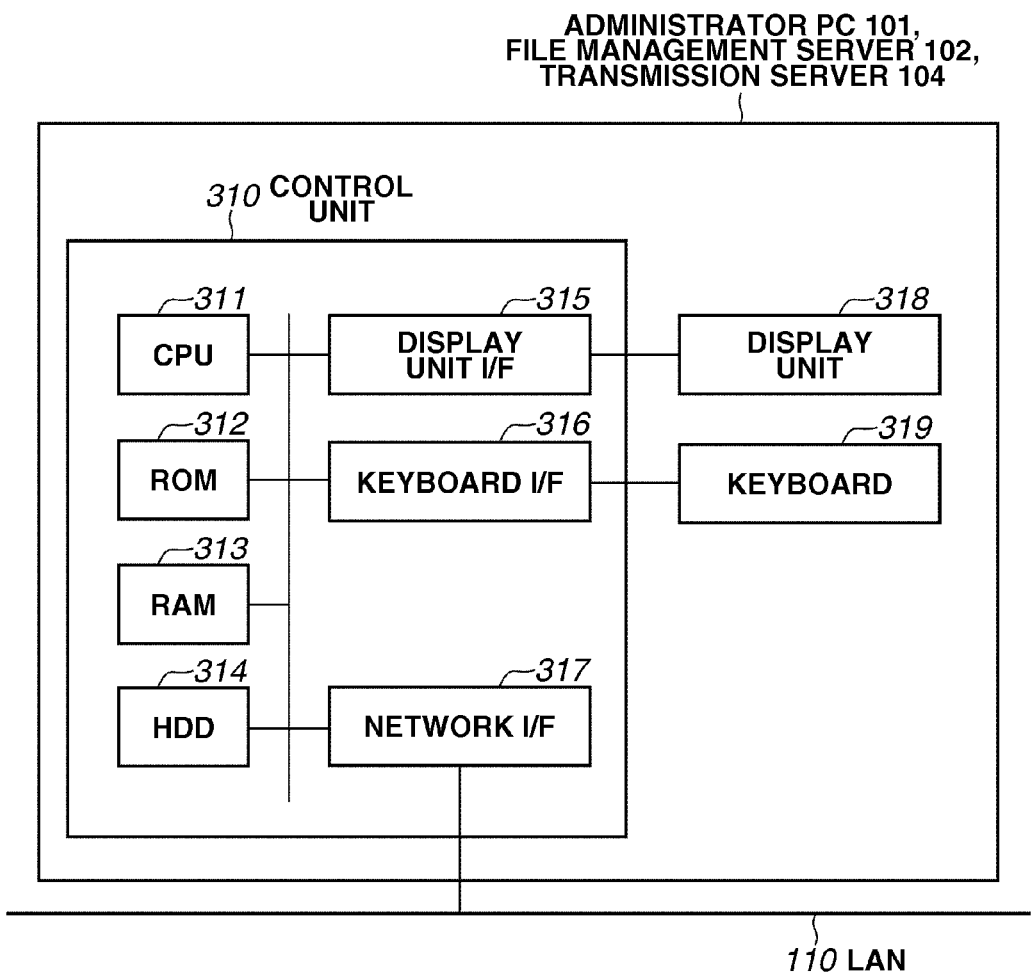
FIG. 3 is a block diagram illustrating a configuration of an administrator personal computer (PC) according to the exemplary embodiment of the present invention.

FIG. 3 is a block diagram illustrating a configuration of the administrator PC 101. The file management server 102 and the transmission server 104 are similar in configuration to the administrator PC 101, and thus described together.

A control unit 310 that includes a CPU 311 controls an overall operation of the administrator PC 101. The CPU 311 reads a control program stored in a ROM 312 to perform various control processes. A RAM 313 is used as a main memory for the CPU 311 or a temporary storage area for a work area. A HDD 314 stores image data or various programs. As described below, the file management server 102 stores a plurality of process definition files in the HDD 314.

A display unit I/F 315 interconnects a display unit 318 and the control unit 310. A keyboard I/F 316 interconnects a keyboard 319 and the control unit 310. The CPU 311 recognizes an instruction from a user via the keyboard 319, and changes a screen displayed on the display unit 318 according to the recognized instruction.

A network I/F 317 connects the control unit 310 (the administrator PC 101) to the LAN 110. The network I/F 317 transfers various pieces of information with other apparatuses on the LAN 110.

Figure 4:
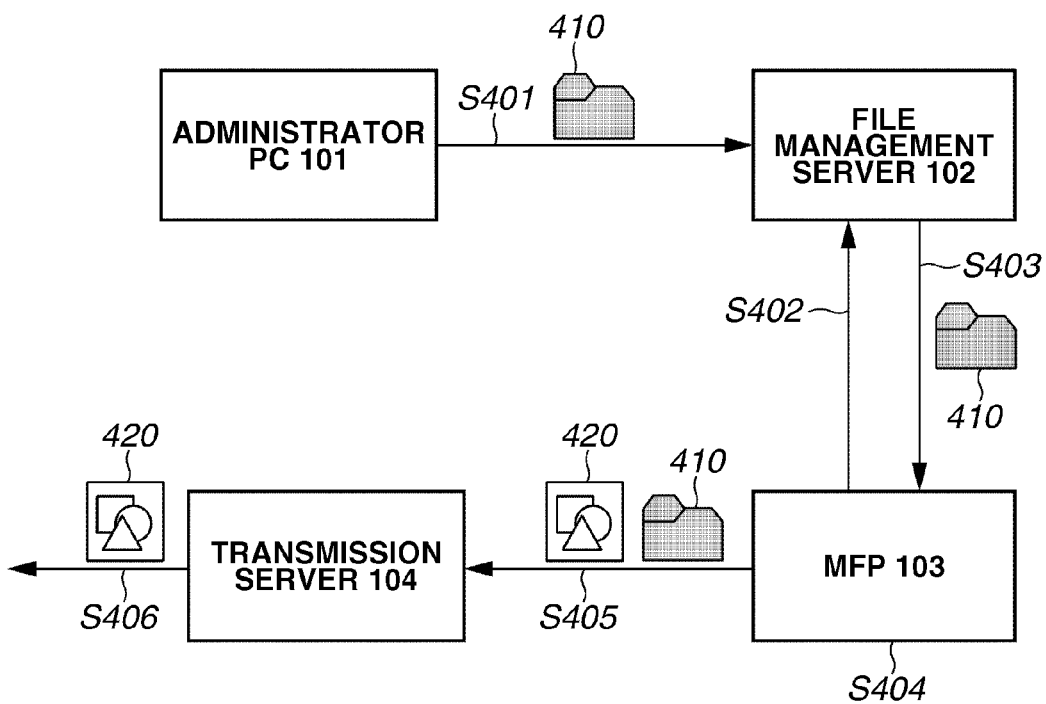
FIG. 4 conceptually illustrates an overall operation of the image processing system according to the exemplary embodiment of the present invention.

Next, referring to FIG. 4, a flow of an operation when processing is performed with using a process definition file in the image processing system according to the present exemplary embodiment is described.

First, a user (administrator) operates the administrator PC 101 to create a process definition file 410. The process definition file 410 includes a definition described to execute a series of processes by utilizing a plurality of functions provided in the MFP 103 or the transmission server 104. In the present exemplary embodiment, it is presumed that in the process definition file 410, execution of a series of processes "the MFP 103 reads an image from a document to generate image data (the reading function), and transmits the generated image data to the transmission server 104 (the transmission function), and the transmission server 104 transmits the image data to a predetermined destination" is defined.

The user inputs various processing contents via a process definition file creation screen displayed on the administrator PC 101. The input processing contents are specifically reading parameters (reading size, resolution, density/image quality, magnification, and the like), a transmission protocol (E-mail, SMB, FTP, or facsimile), and a transmission destination (E-mail address or telephone number). In the process definition file 410 created in the administrator PC, a user ID and a password are associated with each other for each process definition file, and only a specific user is permitted to use the file.

In step S401, after completion of the creation of the process definition file, the created process definition file 410 is transmitted to the file management server 102 via the LAN 110. The file management server 102 that has received the process definition file 410 registers and stores the received process definition file 410 in association with the user ID and the password.

The MFP 103 transmits the user ID and the password input by the user who operates the MFP 103 to the file management server 102. In step S402, the MFP 103 requests a process definition file corresponding to the user who is operating the MFP 103 (corresponding to transmitted user ID and password).

The file management server 102 that has received the request for the process definition file executes authentication of the user based on the received user ID and the received password. When the authentication is successful, in step S403, the file management server 102 reads the process definition file 410 corresponding to the received user ID, and transmits the process definition file 410 to the MFP 103 via the LAN 110.

The MFP 103 that has acquired the process definition file 410 from the file management server 102 presents the acquired process definition file to the user, and accepts selection of the process definition file from the user. In step S404, the MFP 103 causes the scanner 221 to execute reading based on a definition described in the selected process definition file, and generates image data according to the definition described in the selected process definition file.

Then in step S405, the MFP 103 transmits the generated image data 420 and the process definition file 410 to the transmission server 104, and requests the transmission server 104 to transmit the image data.

In step S406, the transmission server 104 transmits the image data 420 to the described transmission destination according to the transmission protocol (E-mail or FTP) described in the received process definition file 410.

The mechanism described above can eliminate the necessity of performing a complex operation such as designation of a reading parameter and a transmission destination each time the user causes the MFP 103 to read the document. The MFP 103 may be inhibited from correcting contents designated during creation of the process definition file by the administrator PC 101. As a result, the user of the MFP 103 can be prevented from performing processing against administrator's intensions.

FIG. 5 illustrates a specific description example of the process definition file 410 stored in the file management server 102. The example is described in an extensible markup language (XML) format. However, process definition files can be described in other formats. Each process defined in the process definition file is described as an XML tag, and an appearance order in the process definition file indicates an execution order of processes.

A tag 501 indicates one process combining a plurality of processes, and a process ID ("0001" in the example illustrated in FIG. 5) uniquely indicating the process definition file and a name of a process ("scan and transmit mail to section chief" in the example illustrated in FIG. 5) are described. A tag 502 defines a process of reading an image from a document by a scanner to generate image data.

A tag 503 defines a process of generating gray scale image data during the reading of the image from the document by the scanner. In other words, the tag 503 indicates one reading parameter. Other reading parameters can be described. A tag 504 defines a process of transmitting the image data by electronic mail. In other words, the tag 504 indicates a transmission protocol utilized for transmitting the image data. In a tag 505, an electronic mail address ("manager@xxxx.xxxx" in the example illustrated in FIG. 5) that becomes a transmission destination of the image data is described.

The MFP 103 can read the image from the document without using any process definition file to transmit the generated image data. In this case, as is conventionally performed, the MFP 103 causes the user to set a reading parameter or a transmission destination of the image through the operation unit 219. Whether such processing, in other words, processing not using any process definition file, is permitted or not can be changed depending on an administrator's operation policy.

Figure 6:
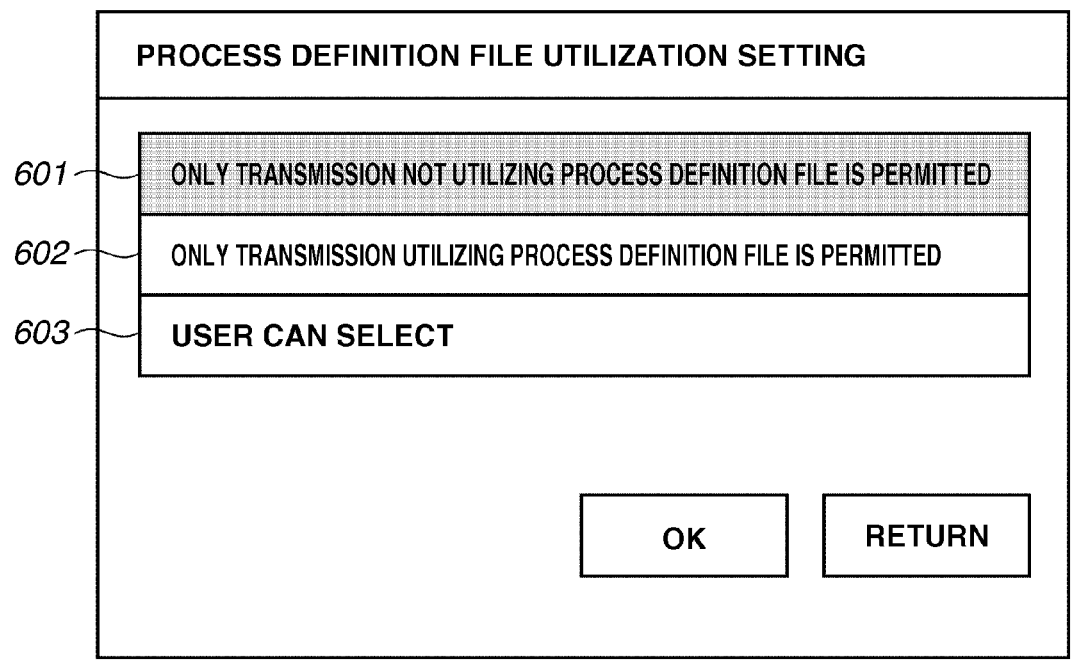
FIG. 6 illustrates an example of a process definition file utilization setting screen.

FIG. 6 illustrates an example of a process definition file utilization setting screen displayed on the operation unit 219 of the MFP 103. The administrator of the MFP 103 can set an operation policy relating to whether a process definition file is utilized by using the process definition file utilization setting screen.

In the present exemplary embodiment, the administrator can select one from three management policies on the process definition file utilization setting screen. When a button 601 is selected, the MFP 103 operates to permit only transmission not utilizing the process definition file. In other words, utilization of the process definition file is inhibited. When a button 602 is selected, the MFP 103 operates to permit only transmission utilizing the process definition file. In other words, transmission not utilizing any process definition file is inhibited. When a button 603 is selected, the MFP 103 operates to enable its user to select to use or not to use the process definition file. In the present exemplary embodiment, contents of the process definition file utilization setting are stored in the HDD 214 of the MFP 103.

Hereinafter, the operations of the MFP 103 when the buttons 601 to 603 are selected on the process definition file utilization setting screen illustrated in FIG. 6 are described in sequence.

Figure 7:
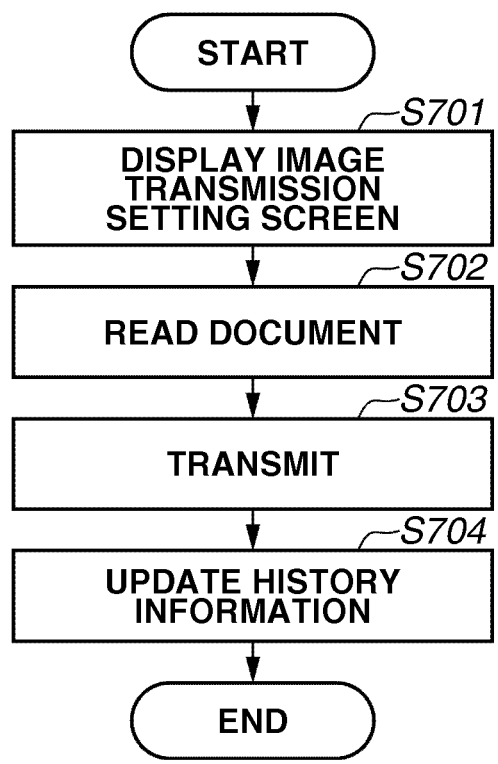
FIG. 7 is a flowchart illustrating an operation of the MFP.

First, referring to a flowchart illustrated in FIG. 7, the operation of the MFP 103 when the button 601 is selected on the process definition file utilization setting screen is described.

Figure 8:
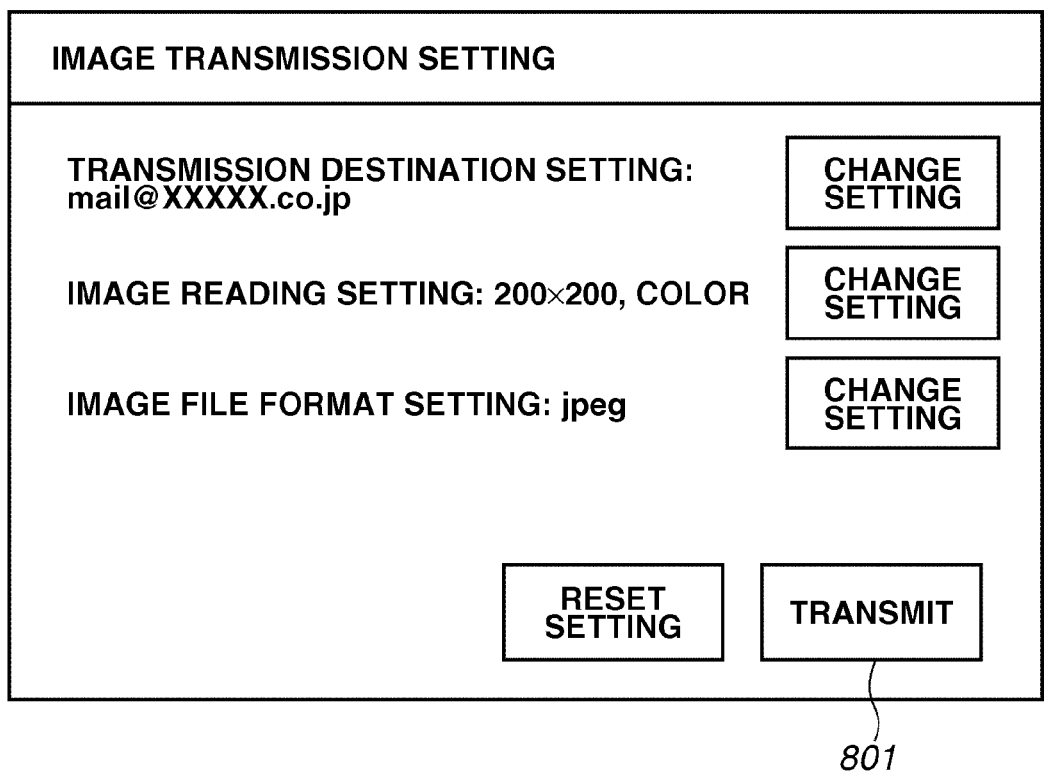
FIG. 8 illustrates an example of an image transmission setting screen.

In step S701, the MFP 103 displays an image transmission setting screen on the operation unit 219. FIG. 8 illustrates an example of the image transmission setting screen. On the image transmission setting screen, the user can arbitrarily set a transmission destination, an image reading parameter, and an image file format during transmission. When the user presses a transmission button 801 illustrated in FIG. 8, the processing proceeds to step S702.

In step S702, the MFP 103 reads an image from a document according to the contents (the reading parameters) set on the image transmission setting screen. In step S703, the MFP 103 transmits the read image to a designated destination according to the contents (the image file format and transmission destination settings) set on the image transmission setting screen. In step S704, the MFP 103 updates history information. The updating of the history information is described in detail below.

Figure 9:
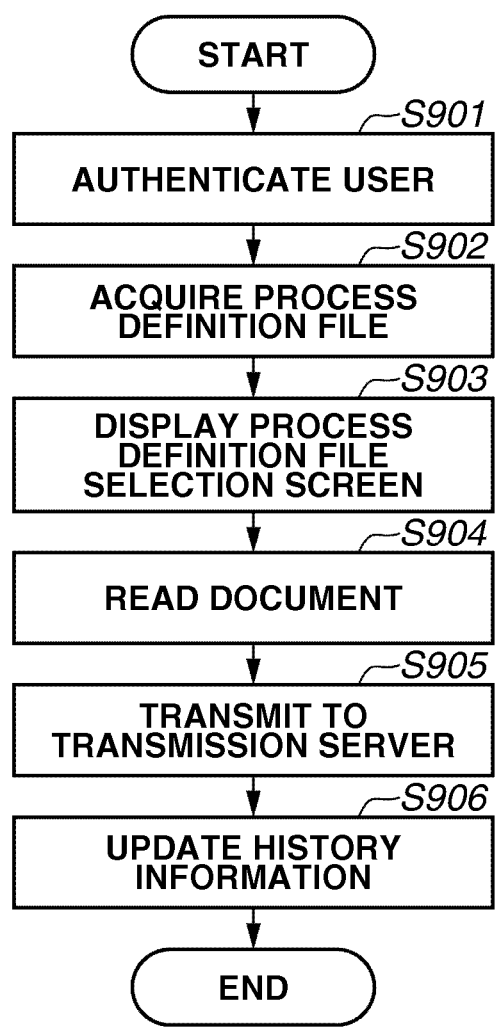
FIG. 9 is a flowchart illustrating an operation of the MFP.

Next, referring to a flowchart illustrated in FIG. 9, the operation of the MFP 103 when the button 602 is selected on the process definition file utilization setting screen is described.

In step S901, authentication of the user who operates the MFP 103 is performed. More specifically, the MFP 103 displays an authentication information input screen to input authentication information such as a user ID or a password on the operation unit 219, and transmits the authentication information input via the screen to the file management server 102. The file management server 102 collates the authentication information, and returns a response indicating successful or failed authentication.

Concerning a user authentication method, a method of inputting authentication information by reading an ID card or a method of performing authentication by using biological information can be employed. The authentication can be performed not by the file management server 102 but by the MFP 103 itself. In such a case, the MFP 103 stores the authentication information associating the user ID and the password.

When the user authentication is successfully performed in step S901, the processing proceeds to step S902, and the MFP 103 requests the process definition file from the file management server 102. More specifically, the MFP 103 transmits the user ID of the authenticated user to the file management server 102. The file management server 102 that has received the user ID transmits one or a plurality of the process definition files associated with the received user ID to the MFP 103.

In step S903, after reception of the process definition files transmitted from the file management server 102, the MFP 103 displays a process definition file selection screen to enable the user to select an arbitrary process definition file.

Figure 10:
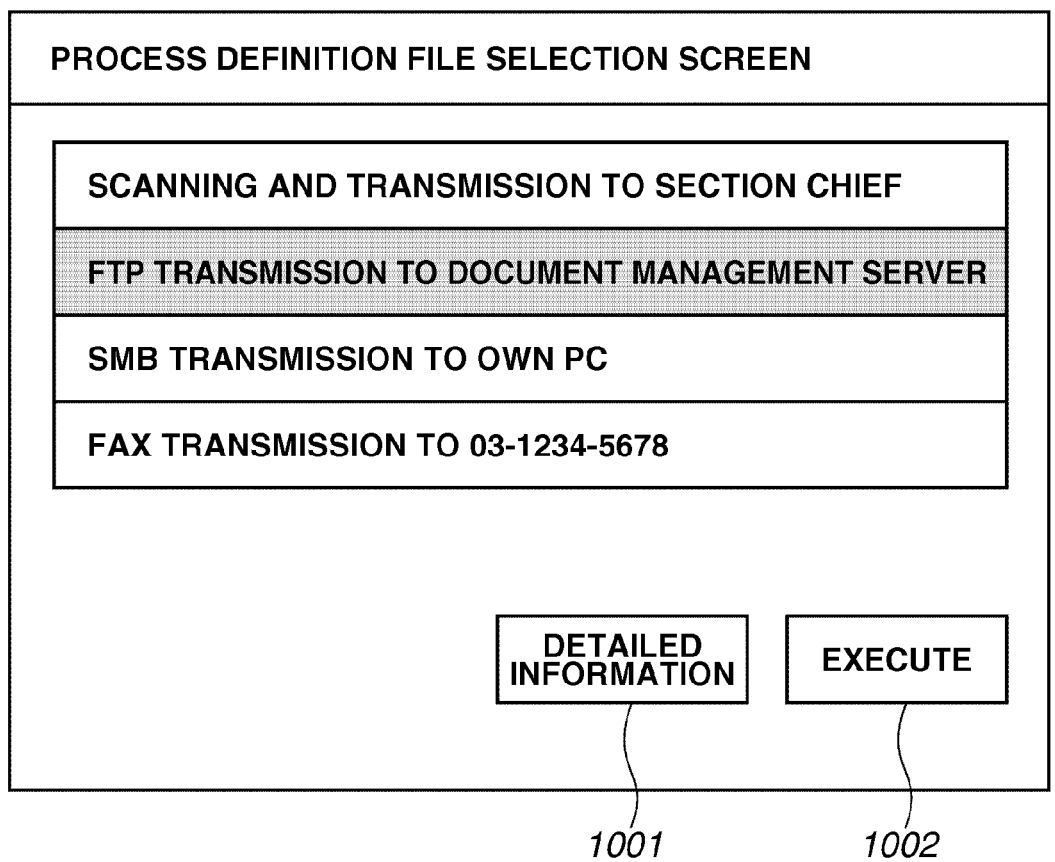
FIG. 10 illustrates an example of a process definition file selection screen.

FIG. 10 illustrates an example of the process definition file selection screen. The process definition files acquired in step S903 are displayed on the screen, and the display is reversed when the user selects the process definition file. In the example illustrated in FIG. 10, four process definition files are displayed to be selectable, and the process definition file of "FTP transmission to document management server" is selected among the four files.

At this time, when detecting that the user has pressed a detailed information display button 1001, the MFP 103 displays a detailed content (information about the reading parameters or the transmission destination described in the process definition file) of the process definition file of "FTP transmission to document management server" on the operation unit 219. When the user presses an execute button 1002, in step S904, the MFP 103 causes the scanner to execute reading based on the described content of the selected process definition file, and to generate image data according to the described definition of the selected process definition file.

In step S905, the MFP 103 associates the selected process definition file with the image data generated in step S904, and transmits the file to the transmission server 104, thereby requesting the transmission server 104 to transmit the image data.

In step S906, the MFP 103 updates history information prepared in the HDD 214. The updating of the history information is described in detail below.

Figure 11:
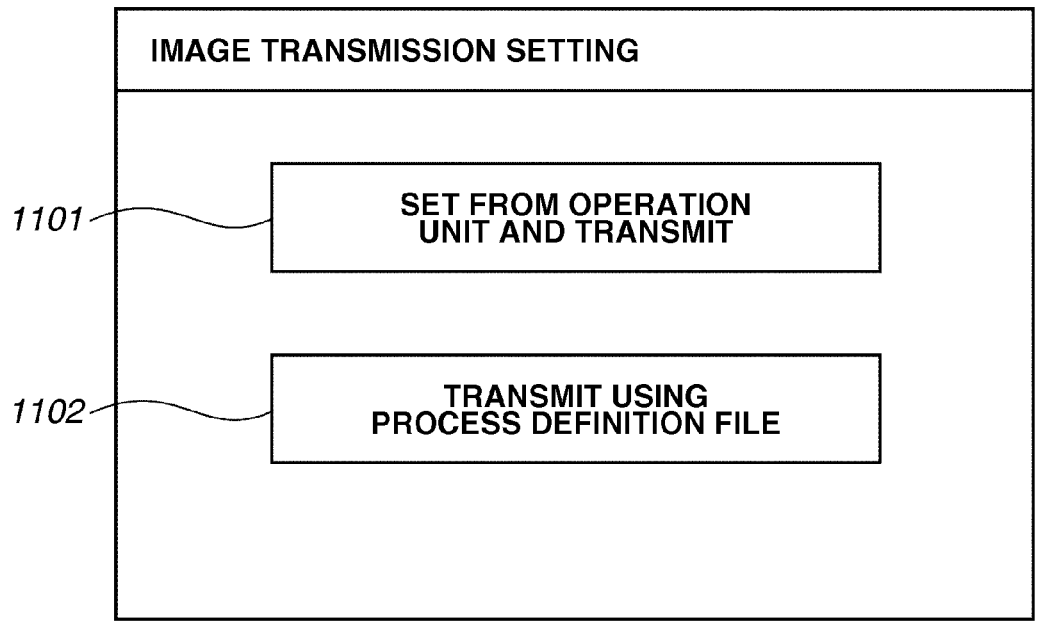
FIG. 11 illustrates an example of an image transmission setting screen.

The operation of the MFP 103 when the button 603 is selected on the process definition file utilization setting screen is described. In this case, the MFP 103 displays an image transmission setting screen illustrated in FIG. 11 on the operation unit 219. The MFP 103 performs processing illustrated in the flowchart in FIG. 7 when a button 1101 is selected, and performs processing illustrated in the flowchart in FIG. 9 when a button 1102 is selected.

As described above, selecting the MFP's operation policy on the process definition utilization setting screen enables the MFP 103 to process the process definition file based on an administrator's intended policy. On the process definition file utilization setting screen illustrated in FIG. 6, restrictions can be placed to permit access only to a user having specific authority such as the administrator.

Figure 12:
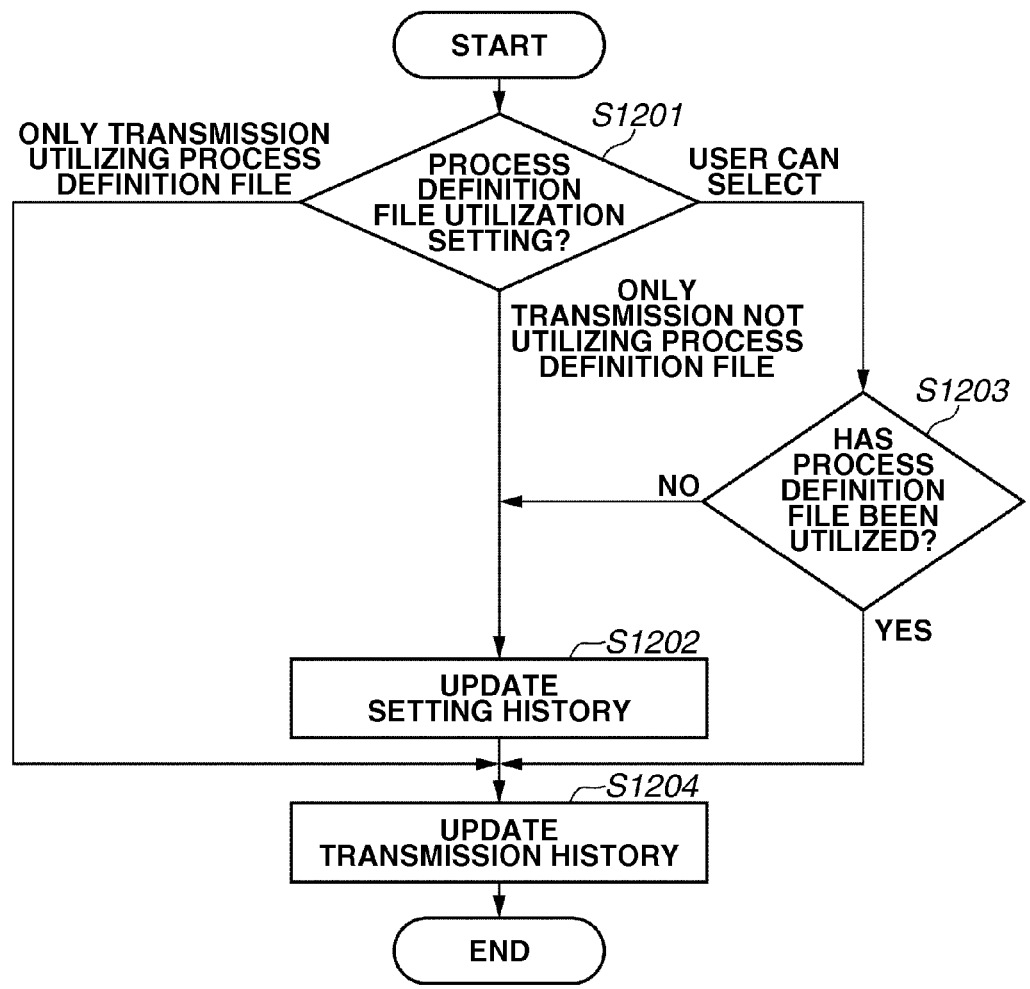
FIG. 12 is a flowchart illustrating an operation of the MFP.

Referring to a flowchart illustrated in FIG. 12, the updating of the history information executed by the MFP 103 in each of step 704 illustrated in FIG. 7 and step S906 illustrated in FIG. 9 is described.

First, the history information stored in the MFP 103 is described. The history information stored in the MFP 103 is largely classified into two types. The first history information is "setting history" which is information used for storing a setting content relating to processing executed by the MFP 103 to be reusable.

Figure 13:
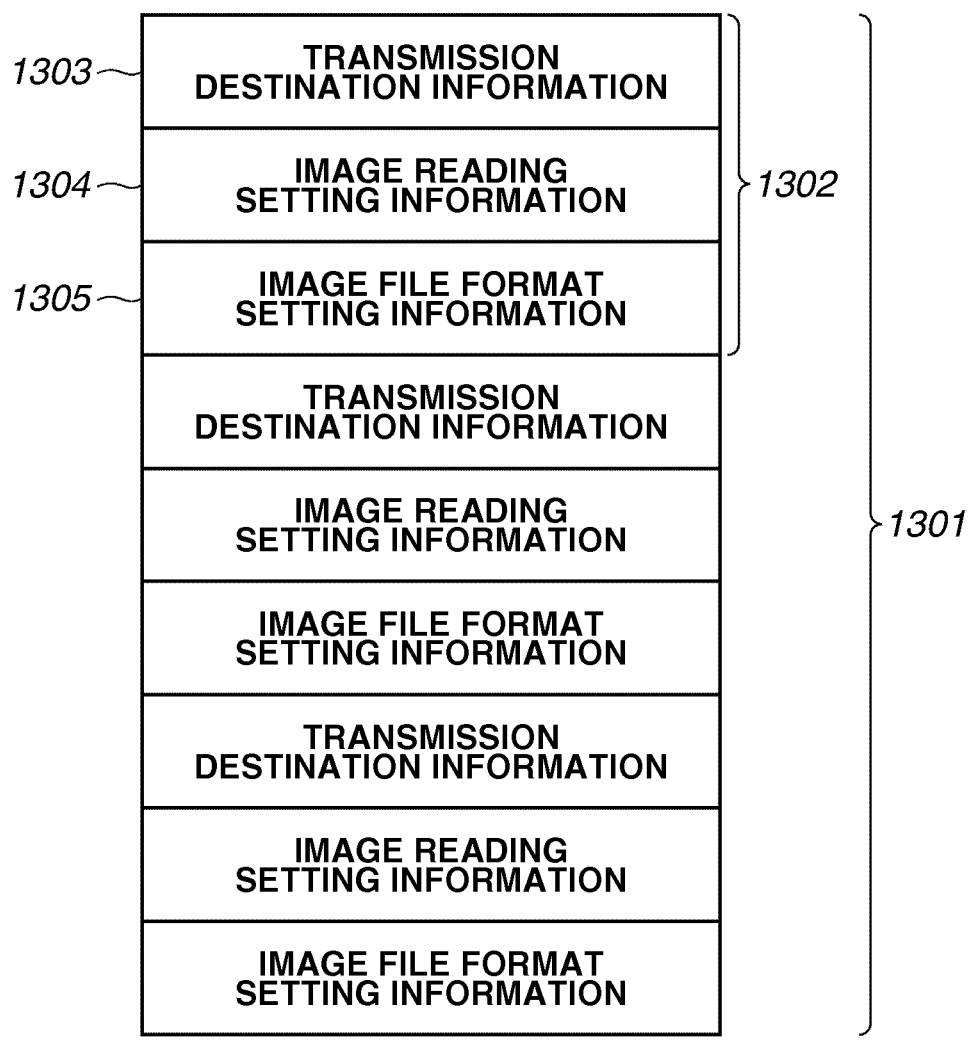
FIG. 13 illustrates a configuration of setting history data.

FIG. 13 illustrates a setting history table stored in the HDD of the MFP 103. In the setting history table, one piece of setting history information 1302 includes transmission destination information 1303, image reading setting information 1304, and image file format setting information 1305. In the example illustrated in FIG. 13, three pieces of setting history information 1302 are stored in a table 1301. For example, when processing is performed based on the setting contents illustrated in FIG. 8, "transmission destination information: mail@xxxxx.co.jp", "image reading setting information: 200*200, color", and "image file format information: jpeg" are stored as a setting history.

When wishing to perform processing based on the same setting again, the user can, by selecting desired one from among the setting histories, automatically set setting contents thereof by the MFP. Thus, time and labor of inputting the same setting contents again can be eliminated. Items stored as the setting histories can include those other than 1303 to 1305. For example, information about date of transmission and a transmission result may be included in the setting history. Further, the number of setting histories stored in the setting history table can be three or more or less.

The second history information is "transmission history" which is information indicating a result of transmission. The transmission history may include pieces of information about a transmission result, a destination, a transmission start date, and a transmission end date. Generally, the transmission history is used by the user to check a processing result or a use status of the MFP subsequently, and setting contents relating to the transmission cannot be reutilized based on the transmission history.

In the present exemplary embodiment, the HDD 214 included in the MFP 103 stores the history information. However, when the MFP 103 includes another nonvolatile storage device, the history information can be written in the nonvolatile storage device. Further, if there is another storage device permitted to communicate through the LAN 110, the history information can be written in the storage device In step S1201 illustrated in FIG. 12, the MFP 103 acquires the contents of the process definition file utilization setting stored in the HDD 214 of the MFP 103. If the process definition file utilization setting is set to permit only transmission not utilizing the process definition file, the processing proceeds to step S1202.

In step S1202, the MFP 103 stores the setting history indicating the setting contents relating to executed processing in the setting history table. For example, when transmission is performed using the setting contents illustrated in FIG. 8, "transmission destination information: mail@xxxxx.co.jp", "image reading setting information: 200*200, color", and "image file format information: jpeg" are stored as the setting history. When the number of setting histories reaches the number permitted to be stored in the setting history table, information of the oldest setting history is deleted, and a current setting history is registered in the setting history table. Then, the processing proceeds to step S1204.

When only transmission utilizing the process definition file is permitted in step S1201, the processing proceeds to step S1204. In this case, the MFP 103 does not store any setting contents relating to processing utilizing the process definition file as the setting history.

When the process definition file utilization setting is set to enable the user to select whether to utilize the process definition file in step S1201, the processing proceeds to step S1203. In step S1203, the MFP 103 checks whether the executed processing is processing utilizing the process definition file.

When the process definition file is not utilized (NO in step S1203), the processing proceeds to step S1202, and the setting history indicating the setting contents relating to the processing is stored. On the other hand, when the process definition file is utilized (YES in step S1203), the processing proceeds to step S1204 without storing the setting contents relating to the processing as the setting history. In step S1204, the MFP 103 stores the history by storing information about the transmission history relating to the executed transmission in the HDD.

The processing of each of the flowcharts illustrated in FIGS. 7, 9, and 12 is performed by the CPU 211 of the MFP 103 executing a program stored in the ROM 212 or the HDD 214. The steps of the flowchart can be distributed and executed among a plurality of CPUs. A device other than the MFP 103 can execute a part of the processing in the flowcharts.

As described above, according to the present exemplary embodiment, when the processing utilizing the process definition file has been executed, the MFP performs control not to store setting items relating to the processing as reusable setting histories. This arrangement can solve security issues, specifically, the process definition file managed for each user is freely utilized by other users based on the setting histories.

When the administrator who has created the process definition file by the administrator PC periodically updates the process definition file to prevent use of old process definition files, use of the old process definition files can be surely prevented because no old process definition file is remained as the setting history in the MFP.

Whether to store the setting histories indicating the setting contents of the executed processing can be switched according to an operation policy (setting contents illustrated in FIG. 6) relating to utilization of the process definition file. Thus, control of the MFP can be simple, and large effects similar to those described above can be provided.

Next, a second exemplary embodiment is described. According to the first exemplary embodiment, no setting history relating to processing utilizing the process definition file is stored. On the other hand, according to the present exemplary embodiment, concerning the processing utilizing the process definition file, the setting history is managed to be stored for each user. Description of portions similar to those of the first exemplary embodiment is omitted below.

Figure 14:
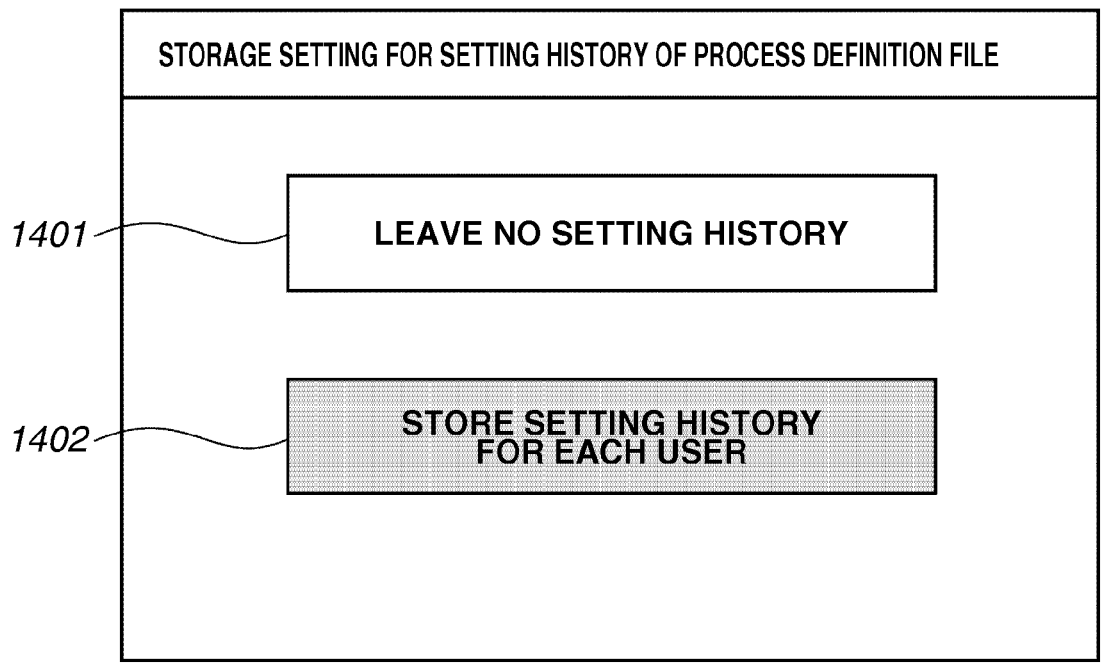
FIG. 14 illustrates an example of a setting history storage setting screen of a process definition file.

FIG. 14 illustrates an example of a screen for setting whether to store any setting history relating to processing utilizing the process definition file. An administrator of a MFP 103 can set whether to store any setting history relating to the processing utilizing the process definition file on the screen.

On the screen illustrated in FIG. 14, when a button 1401 is selected, as in the case of the first exemplary embodiment, the MFP 103 operates not to leave any setting history relating to the processing executed utilizing the process definition file.

When a button 1402 is selected, the MFP 103 operates to store the setting history for each user relating to the processing executed utilizing the process definition file. In the present exemplary embodiment, contents of the setting are stored in a HDD 214 of the MFP 103.

Figure 15:
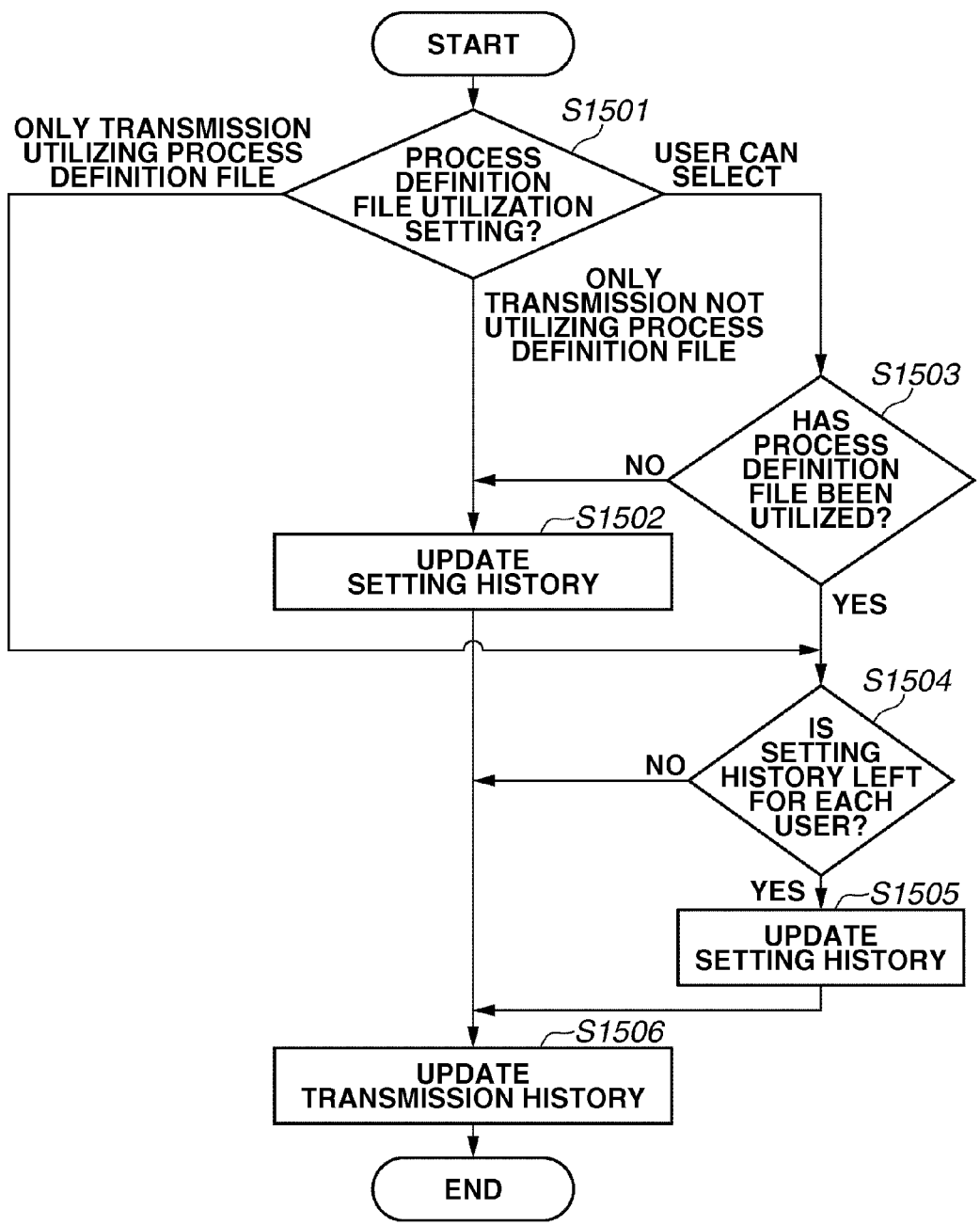
FIG. 15 is a flowchart illustrating an operation of the MFP.

Referring to a flowchart illustrated in FIG. 15, the updating of the history information executed in step S704 illustrated in FIG. 7 and in step S906 illustrated in FIG. 9 is described. A CPU 211 of the MFP 103 performs processing of the flowchart by executing a program stored in a ROM 212 or the HDD 214. Steps of the flowchart can be distributed and executed among a plurality of CPUs. A device other than the MFP 103 can execute a part of the processing in the flowcharts.

In step S1501 illustrated in FIG. 15, the MFP 103 acquires the contents of the process definition file utilization setting stored in the HDD 214 of the MFP 103. If the process definition file utilization setting is set to permit only transmission not utilizing the process definition file, the processing proceeds to step S1502.

In step S1502, the MFP 103 stores the setting history indicating the setting contents relating to executed processing in the setting history table. For example, when transmission in FIG. 8, "transmission destination information: mail@xxxxx.co.jp", "image reading setting information: 200*200, color", and "image file format information: jpeg" are stored as the setting history. Then, the processing proceeds to step S1506.

When only transmission utilizing the process definition file is permitted in step S1501, the processing proceeds to step S1504.

When the process definition file utilization setting is set to enable the user to select whether to utilize the process definition file in step S1501, the processing proceeds to step S1503. In step S1503, the MFP 103 checks whether the executed processing is processing utilizing the process definition file. When the process definition file is not utilized (NO in step S1503), the processing proceeds to step S1502, and the setting history indicating the setting contents relating to the processing is stored. On the other hand, when the processing definition file has been utilized (YES in step S1503), the processing proceeds to step S1504.

In step S1504, the MFP 103 checks the setting content illustrated in FIG. 14 on whether to store the setting history relating to the processing that has utilized the process definition file. When the button 1401 is selected (NO in step S1504), the processing proceeds to step S1506 without storing any setting history in the setting history table.

When the button 1402 is selected (YES in step S1504), the processing proceeds to step S1505. In step S1505, the setting history of the processing executed utilizing the process definition file is stored in the setting history table together with a user ID (specifying information) associated with the process definition file.

Figure 16:
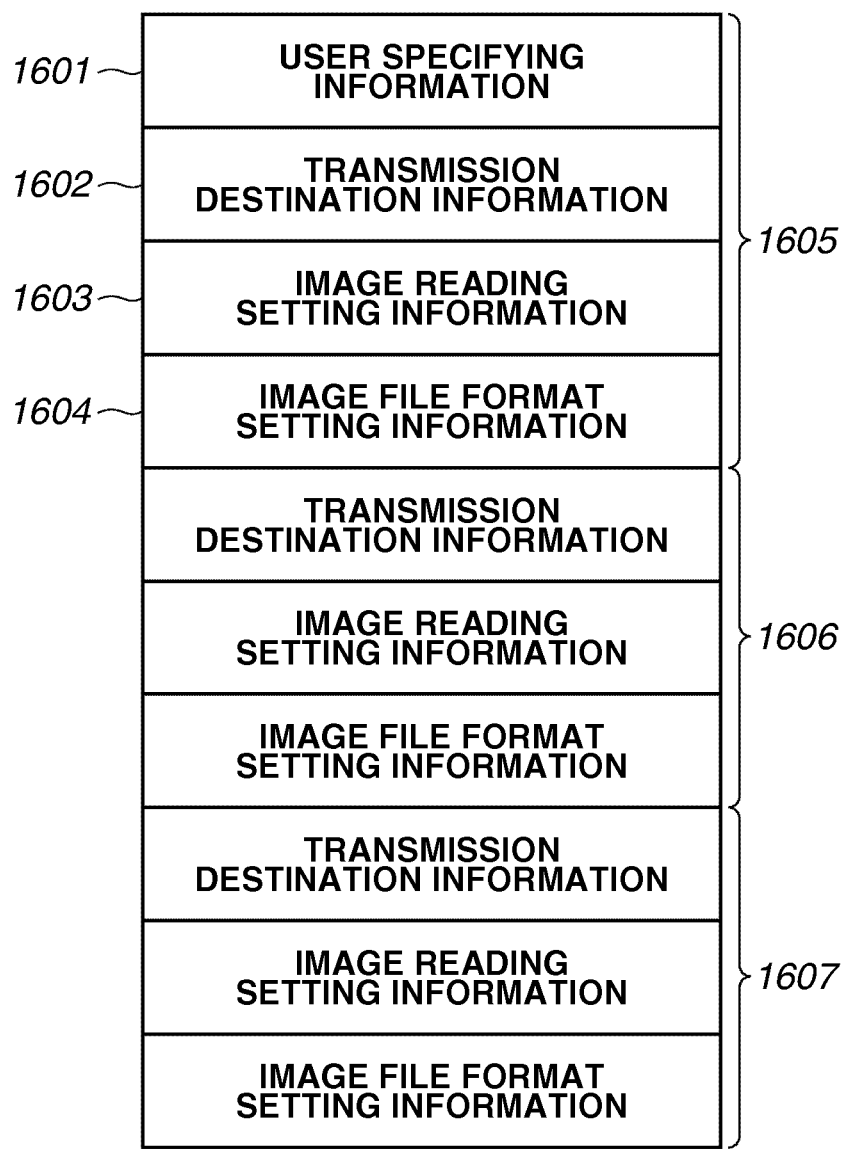
FIG. 16 illustrates a configuration of setting history data of each user.

FIG. 16 illustrates a setting history table stored in the HDD of the MFP 103 according to the present exemplary embodiment. Different from the setting history table illustrated in FIG. 13, this setting history table includes, for one piece of setting history information 1605, user specifying information 1601 in addition to transmission destination information 1602, image reading setting information 1603, and image file format setting information 1604. The user specifying information 1601 stores specifying information such as a user ID to specify each user, and corresponds one to one to the authentication information used in step S901.

In the example of the setting history table illustrated in FIG. 16, three pieces of setting history information 1605, 1606, and 1607 are stored, and only the setting history information 1605 among them includes the user specifying information. In other words, the setting history information 1605 indicates a setting history for processing executed by utilizing the process definition file. The pieces of setting history information 1606 and 1607 indicate setting histories for processing executed without utilizing any process definition file.

When the setting information relating to the processing executed by utilizing the process definition file is reutilized by managing such a setting history table, the user authentication can be performed. This arrangement can prevent security concerns, specifically, other users freely utilize the process definition file.

After the end of processing in step S1505, the processing proceeds to step S1506. In step S1506, the MFP 103 stores information of the transmission history relating to executed transmission in the HDD.

In the present exemplary embodiment, the HDD 214 included in the MFP 103 stores the history information. However, when the MFP 103 includes another nonvolatile storage device, the history information can be written in the nonvolatile storage device. Further, if there is another storage device permitted to communicate through the LAN 110, the history information can be written in the storage device After the end of the processes illustrated in FIGS. 7 and 9, when the user of the MFP 103 reutilizes desired setting with using the setting history, the pieces of setting history information stored in the setting history table are referred to, and displayed as selection candidates on the screen of the MFP. The user selects a setting history to use among the candidates. When the user selects the setting history including user specifying information among the pieces of setting history information, the user is prompted to input user specifying information, and whether the input user specifying information matches the user specifying information included in the setting history information is determined. As a result, the setting history information is permitted to be reutilized when matched, and inhibited to be reutilized when not matched. Thus, security concerns, specifically, the process definition file managed for each user is freely utilized by other users based on the setting history, can be solved.

In the example illustrated in FIG. 16, a record of user specifying information is provided for each piece of the setting history information stored in the setting history table. However, user specifying information can be allocated to the setting history table itself. In other words, a setting history table can be provided for each user. In such a case, a setting history of processing not utilizing any process definition file is stored in the setting history tables of all the users. On the other hand, a setting history of processing executed utilizing a process definition file is stored only in the setting history table of a user corresponding to the process definition file.

As a management method of setting history tables, a shared setting history table to which all the users can refer and a setting history table managed for each user can be stored separately. In such a case, the setting history of processing not utilizing any process definition file is stored in the shared setting history table. On the other hand, the setting history of processing executed utilizing the process definition file is stored only in the setting history table of the user corresponding to the process definition file.

In any method, according to the present exemplary embodiment, by storing the setting history relating to the processing executed utilizing the process definition file together with the user specifying information, restrictions can be placed on users who reutilize the setting history. As a result, since restrictions can be placed on users who reutilize the setting history, security concerns, specifically, the process definition file managed for each user is freely utilized by other users based on the setting history, can be solved.

In the description of the exemplary embodiment, the process definition file describes the processing executed by combining the reading function and the transmission function. However, processing described by the process definition file can be other than this processing. In the exemplary embodiment, the file management server stores the process definition file created by the administrator PC. However, the MFP or the other devices can store the process definition file. In other words, similar processing can be performed by combining functions of the devices illustrated in FIG. 4 or integrating functions in one device.

In the description of the exemplary embodiment, no setting history is stored for the processing executed utilizing the process definition file. "No setting history is stored" means that the setting history is not stored to permit reutilization. In other words, setting histories actually stored in a memory such as a HDD or a ROM but inhibited to be reutilized (e.g., setting histories not displayed as candidates in a call function) are included in those not stored in the present exemplary embodiment.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-045542 filed Mar. 2, 2010, which is hereby incorporated by reference herein in its entirety.

What is claimed is:

1. An image processing apparatus comprising:
a reading unit that reads an image on a document to generate image data of the image;
a first storage unit that stores a transmission destination history indicating a history of a transmission destination of the image data generated by the reading unit, but only in a case in which the first storage unit is controlled to store the transmission destination history;
a setting unit setting a transmission destination according to a selected transmission destination history stored in the first storage unit;
an operation unit that receives user's input of user information which specifies a user and a transmission destination in response to input of the user's input by the user;
an acquisition unit that acquires a definition file associated with the user information received by the operation unit, the definition file including a transmission destination used for data transmission;
a transmission unit that, in response to a content of the definition file, transmits the generated image data by one of a first transmission method, a second transmission method, and a third transmission method, the first transmission method transmitting the generated image data only according to the transmission destination set by the setting unit, the second transmission method transmitting the generated image data only according to the transmission destination included in the acquired definition file and preventing the setting unit from setting the transmission destination according to the selected transmission destination history, and the third transmission method transmitting the generated image data, according to either the transmission destination set by the setting unit or the transmission destination included in the acquired definition file, in response to a selection by the user; and a control unit that controls the first storage unit to store the transmission destination history, in a case where the transmission unit transmits the generated image data by the first transmission method, and that controls the first storage unit not to store the transmission destination history, in a case where the transmission unit transmits the generated image data by the second transmission method so that no information obtained from the definition file is stored in the first storage unit.

2. The apparatus according to claim 1, further comprising a second storage unit that stores a transmission history indicating a result of the data transmission, wherein the setting unit cannot set the transmission destination based on the transmission history stored by the second storage unit.

3. The apparatus according to claim 1, wherein the definition file includes a transmission protocol.

4. The apparatus according to claim 2, wherein the control unit performs control to store the transmission history in the second storage unit regardless of a transmission method performed by the transmission unit.

5. The apparatus according to claim 1, wherein the definition file includes a reading parameter, which is used for reading an image the image by the reading unit.

6. An image processing apparatus comprising:

a reading unit that reads an image on a document to generate image data of the image;

a first storage unit that stores a transmission destination history indicating a history of a transmission destination of the image data generated by the reading unit, but only in a case in which the first storage unit is controlled to store the transmission destination history;

a first setting unit setting a transmission destination according to a selected transmission destination history stored in the first storage unit;

an operation unit that receives user's input of user information which specifies a user and a transmission destination in response to input of the user's input by the user;

an acquisition unit that acquires a definition file associated with the user information received by the operation unit, the definition file includes a transmission destination used for data transmission;

a transmission unit that, in response to a content of the definition file, transmits the generated image data by one of a first transmission method, a second transmission method, and a third transmission method, the first transmission method transmitting the generated image data only according to the transmission destination set by the first setting unit, the second transmission method transmitting the generated image data only according to the transmission destination included in the acquired definition file and preventing the first setting unit from setting the transmission destination according to the selected transmission destination history, and the third transmission method transmitting the generated image data, according to either the transmission destination set by the first setting unit or the transmission destination included in the acquired definition file, in response to a selection by the user;

a second setting unit for setting inhibition of the data transmission by the first transmission method; and a control unit that controls the first storage unit not to store the transmission destination history, in a case where the second setting unit sets the inhibition of the data transmission by the first transmission method so that no information obtained from the definition file is stored in the first storage unit.

7. The apparatus according to claim 6, further comprising a second storage unit that stores a transmission history indicating a result of the data transmission, wherein the first setting unit cannot set the transmission destination based on the transmission history stored by the second storage unit.

8. The apparatus according to claim 7, wherein the control unit performs control to store the transmission history in the second storage unit regardless of a transmission method performed by the transmission unit.

9. The apparatus according to claim 6, wherein the definition file includes a reading parameter, which is used for reading the image by the reading unit.

10. A method for controlling an image processing apparatus, the method comprising:

reading an image on a document to generate image data of the image;

storing, by a first storage unit, a transmission destination history indicating a history of a transmission destination of the generated image data, but only in a case in which the first storage unit is controlled to store the transmission destination history;

setting a transmission destination according to a selected transmission destination history stored in the first storage unit;

receiving user's input of user information which specifies a user and a transmission destination in response to input of the user's input by the user;

acquiring a definition file association with the received user information, the definition file including a transmission destination used for data transmission;

in response to a content of the definition file, transmitting the generated image data by a transmission unit by one of a first transmission method, a second transmission method, and a third transmission method, the first transmission method transmitting the generated image data only according to the transmission destination set by the setting, the second transmission method transmitting the generated image data only according to the transmission destination included in the acquired definition file and preventing the setting of the transmission destination according to the selected transmission destination history, and the third transmission method transmitting the generated image data, according to either the transmission destination set by the setting or the transmission destination included in the acquired definition file, in response to a selection by the user; and controlling the first storage unit to store the transmission destination history, in a case where the transmission unit transmits the generated image data by the first transmission method, and to control the first storage unit not to store the transmission destination history, in a case where the transmission unit transmits the generated image data by the second transmission method so that no information obtained from the definition file is stored in the first storage unit.

11. The method according to claim 10, further comprising storing, by a second storage unit, a transmission history indicating a result of the data transmission, wherein the setting cannot set the transmission destination based on the stored transmission history.

12. The method according to claim 10, wherein the definition file includes a transmission protocol.

13. A non-transitory computer-readable recording medium storing a computer program for causing a computer to execute steps of the method according to claim 10.

14. The non-transitory computer-readable recording medium according to claim 13 further comprising storing a transmission history indicating a result of the data transmission.

15. The non-transitory computer-readable recording medium according to claim 13, wherein the definition file includes a transmission protocol.

16. A method for controlling an image processing apparatus, the method comprising:
   reading an image on a document to generate image data of the image;
   storing, by a first storage unit, a transmission destination history indicating a history of a transmission destination of the generated image data generated, but only in a case in which the first storage unit is controlled to store the transmission destination history;
   setting a transmission destination according to a selected transmission destination history stored in the first storage unit;
   receiving by an operation unit user's input of user information which specifies a user and a transmission destination is response to input of the user's input by the user;
   acquiring a definition file associated with the received user information, the definition file including a transmission destination used for data transmission;
   in response to a content of the definition file, transmitting the generated image data by one of a first transmission method, a second transmission method, and a third transmission method, the first transmission method transmitting the generated image data only according to the transmission destination received by the operation unit, the second transmission method transmitting the generated image data only according to the transmission destination included in the acquired definition file and preventing the setting of the transmission destination according to the selected transmission destination history, and the third transmission method transmitting the generated image data, according to either the transmission destination set by the setting or the transmission destination included in the acquired definition file, in response to a selected by the user;
   setting inhibition of the data transmission by the first transmission method; and
   control the first storage unit not to store the transmission destination history, in a case where inhibition of the data transmission by the first transmission method is set so that no information obtained from the definition file is stored in the first storage unit.

17. The method according to claim 16, further comprising storing in a second storage unit a transmission history indicating a result of the data transmission,
   wherein the setting cannot set the transmission destination based on the transmission history stored by the storing in the second storage unit.

* * * * *